(12) United States Patent
Schmidt (10) Patent No.: US 6,554,604 B1
(45) Date of Patent: Apr. 29, 2003

(54) SYSTEM FOR INDIVIDUAL CONTROL OF MULTIPLE VALVE GATES

(75) Inventor: Harald Schmidt, Georgetown (CA)

(73) Assignee: Synventive Molding Solutions Canada, Inc., Georgetown (CA)

(*) Notice: Subject to any disclaimer, the term of this patent is extended or adjusted under 35 U.S.C. 154(b) by 0 days.

(21) Appl. No.: 09/716,725

(22) Filed: Nov. 20, 2000

Related U.S. Application Data (63) Continuation of application No. PCT/US99/11391, filed on May 20, 1999, and a continuation-in-part of application No. 09/081,360, filed on May 19, 1998.
(60) Provisional application No. 60/086,169, filed on May 20, 1998, and provisional application No. 60/076,612, filed on Mar. 3, 1998.

(51) Int. Cl.[7] .............................. B29C 45/23
(52) U.S. Cl. ...................... 425/564; 425/566

(58) Field of Search .................... 425/562, 563, 425/564, 565, 566

(56) References Cited

U.S. PATENT DOCUMENTS 6,254,377 B1 * 7/2001 Kazmer et al. ............. 425/562

* cited by examiner

*Primary Examiner*—Tim Heitbrink
(74) *Attorney, Agent, or Firm*—Kudirka & Jobse, LLP (57) ABSTRACT

In an injection molding machine, an apparatus for automatically controlling the movement of two or more valve pins wherein each valve pin is driven by a separately controlled fluid driven cylinder each cylinder being mounted on a heated manifold and being interconnected to a separate valve pin for effecting reciprocal movement of the valve pin wherein the reciprocal movement of the valve pin controls the flow of molten plastic being delivered through a nozzle which delivers molten plastic to a gate of a mold.

13 Claims, 6 Drawing Sheets

SYSTEM FOR INDIVIDUAL CONTROL OF MULTIPLE VALVE GATES

CROSS-REFERENCE TO RELATED APPLICATIONS

This application is a continuation of and claims priority to both PCT application Ser. No. PCT/US99/11391, filed May 20, 1999, and U.S. Provisional Application Ser. Nos. 60/086, 169, entitled FLUID DISTRIBUTOR DUCT, filed May 20, 1998, the disclosures of both of which are incorporated in their entirety by reference herein.

RELATED APPLICATIONS

This is a continuation-in-part of and I claim, under 35 USC Section 120, the benefit of U.S. application Ser. No. 09/081,360 entitled "Fluid Distributor Duct", filed May 19, 1998 which claims, under 35 USC Section 119(e), the benefit of Provisional Application Ser. No. 60/076,612, filed Mar. 3, 1998 entitled, Fluid Distributor Duct to which I further claim priority.

BACKGROUND

The present invention relates to distributor ducts, and controls for their operation and associated components, which deliver gaseous or liquid fluid to the fluid ports of a fluid powered mechanism, and more particularly, to a distributor duct for controlling the input and output under pressure of fluid to a plurality of pneumatic or hydraulic cylinders which are used to control the reciprocating movement of valve pins which control the flow of molten plastic into a mold cavity in an injection molding machine/apparatus.

SUMMARY OF THE INVENTION

The present invention comprises a distributor for delivering an actuator operating fluid, e.g. oil/hydraulic or gas/air, via a common duct or ducts to a plurality of fluid driven cylinders in an injection molding machine and two or more control mechanisms which control the operation of two or more of the cylinders such that the cylinders and their associated valves can be independently controlled to deliver the flow of molten plastic at differing time and rates to one or more mold cavities. Operation or actuation of the control mechanisms for the cylinders is preferably controlled via a computer program which executes an algorithm using parameters such as a condition of the plastic melt flow in the nozzles or the mold cavity or a hotrunner which supplies melt flow to the nozzles. The algorithm may utilize other parameters such as the position of a valve pin or injection screw or a condition of the machine, hotrunner, mold or component thereof. Typically the pressure of the plastic melt in the nozzles, mold cavity or hotrunner is utilized as an input variable to the control algorithm. The distributor is preferably readily attachable to and detachable from the cylinders such that a sealed connection can be readily effected between fluid delivery channels provided in the distributor and fluid feed bores provided in the cylinders. The distributor is structurally independent of the cylinders which have self-contained fluid sealable piston bores and are spaced from the heated components of the machine.

The disclosure of copending U.S. application Ser. No. 08/972,277, for Apparatus For Controlling Plastic Melt Flow In Injection Molding Machines, filed Nov. 18, 1997 by the same inventor is incorporated herein by reference. This application claims the priority benefit of prior filed co-pending provisional application Ser. No. 60/076,612 filed Mar. 3, 1998. The disclosure of copending U.S. application Ser. No. 09/063,762 entitled "Manifold System Having Flow Control" filed Apr. 21, 1998 assigned to the same effective assignee is also incorporated herein by reference.

In accordance with the invention there is provided, in an injection molding machine, an apparatus for automatically controlling the movement of two or more valve pins wherein each valve pin is driven by a separately controlled fluid driven cylinder each cylinder being mounted on a heated manifold and being interconnected to a separate valve pin for effecting reciprocal movement of the valve pin wherein the reciprocal movement of the valve pin controls the flow of molten plastic being delivered through a nozzle which delivers molten plastic to a gate of a mold, the apparatus comprising: a fluid distributor housing having one or more fluid flow channels which commonly delivers a drive fluid to each of the cylinders, each of the cylinders having a piston slidably mounted within a bore of an enclosed cylinder housing for reciprocal fluid driven movement of the piston within the bore of the cylinder housing; each cylinder having a first and a second fluid input port to the bore of each cylinder housing, the first and second fluid input ports being selectively connectable to a fluid flow channel of the fluid distributor housing; and, a drive fluid controller associated with each cylinder, each controller being controllable to selectively connect one or the other of the first and second fluid input ports of each cylinder to a fluid flow channel.

Each controller is preferably interconnected to a common computer program which controls operation of each controller according to a predetermined algorithm. The algorithm typically controls the operation of the controllers according to one or more of a sensed condition of the molten plastic, a selected position of a valve pin and a selected condition or position of the injection molding machine.

Further in accordance with the invention there is provided an apparatus for separately controlling the movement of two or more valve pins wherein each valve pin is driven by a separate fluid driven cylinder each separate cylinder being mounted on a heated manifold and being interconnected to a separate valve pin for effecting reciprocal movement of the valve pin wherein the reciprocal movement of the valve pin controls the flow of molten plastic being delivered through a nozzle which delivers molten plastic to a gate of a mold, the apparatus comprising:

a fluid distributor housing having a fluid flow channel which commonly delivers a drive fluid to each of the cylinders, each of the cylinders having a piston slidably mounted within a bore of an enclosed cylinder housing for reciprocal fluid driven movement of the piston within the bore of the cylinder housing;

each cylinder having a first and a second fluid input port to the bore of each cylinder housing, the first and second fluid input ports being selectively connectable to the fluid flow channel of the fluid distributor housing;

a drive fluid switch associated with each cylinder, each switch having a drive fluid flow connector and a drive fluid seal, the connector of each switch being connectable to one of the first and second fluid input ports of each cylinder while the seal of each switch is simultaneously operative to act on the other of the first and second fluid input ports of each cylinder.

Preferably, each switch is independently controllable to switch the connection of the connector and the seal between the first and second fluid input ports of each cylinder. Each switch is typically interconnected to an electrically driven mechanism, the electrically driven mechanism driving the switch between a first position connecting the first fluid input port to the fluid flow channel and a second position connecting the second fluid input port to the fluid flow channel.

Preferably, the electrically driven mechanisms are interconnected to a common computer program which controls the drive of each electrically driven mechanism according to a predetermined algorithm. The algorithm is typically configured to control the drive of the electrically driven mechanisms according to at least one of a selected condition of the molten plastic, a selected position of the valve pin and a selected condition or position of the injection molding machine.

The fluid distributor housing typically includes first and second fluid flow bores sealably matable with the first and second fluid flow ports respectively of each cylinder. Most preferably a compressible member is sandwiched between each fluid flow bore of the distributor housing and each complementary fluid input port of the cylinders such that fluid flow between each fluid flow bore and each complementary fluid input port is fluid sealed. Each cylinder is preferably configured to have a selected widened external mounting surface and wherein the distributor duct housing has complementary selected widened external surface areas for mating with the selected mounting surfaces of the cylinders.

Most preferably the fluid distributor housing is readily attachable to and detachable from each of the cylinders, the cylinders are mounted a spaced distance on and from an external surface of the heated manifold and the cylinders are interconnected to the valve pins at a position external to the bores of the enclosed cylinder housings. The fluid distributor housing may comprise a heat conductive material, the fluid distributor housing being mounted on the cylinders such that the selected widened mounting surfaces of the cylinders are mated in compressed contact with the complementary selected widened surface areas of the fluid distributor housing, heat being readily conductible from the cylinders to the fluid distributor housing through the mated surfaces.

The fluid distributor housing may comprise at least a portion of a wall of the cylinder housing which sealably encloses the bore of the cylinder or the fluid distributor housing may comprise a structure independent of the cylinder housing which is readily attachable to and detachable therefrom.

DETAILED DESCRIPTION OF THE INVENTION

Figure 2:
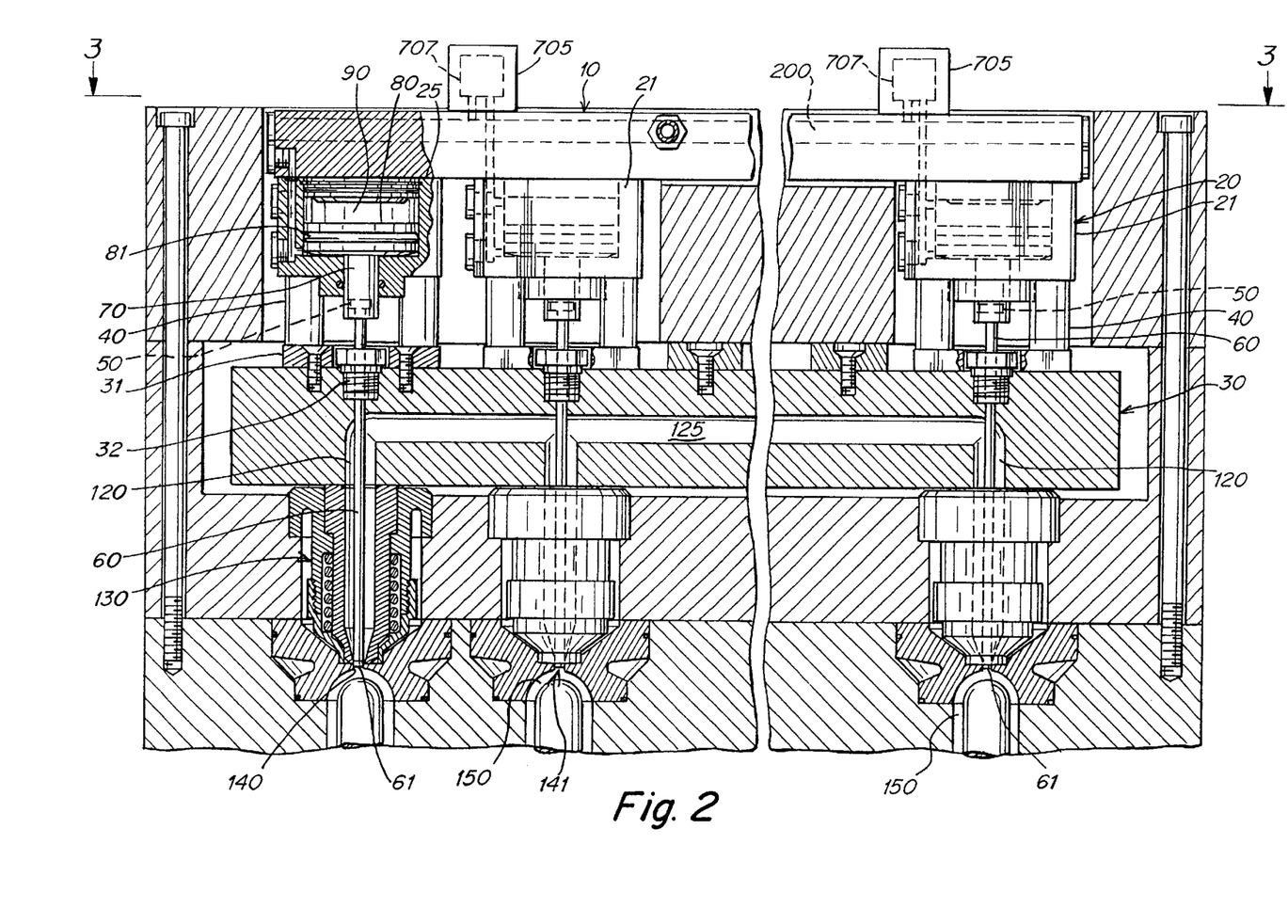
FIG. 2 is a cross-sectional view of a portion of an injection molding machine showing, according to the invention, an arrangement of fluid driven cylinders and a distributor duct for the cylinders mounted on a manifold for distributing molten plastic flow to a series of nozzles.
Figure 3:
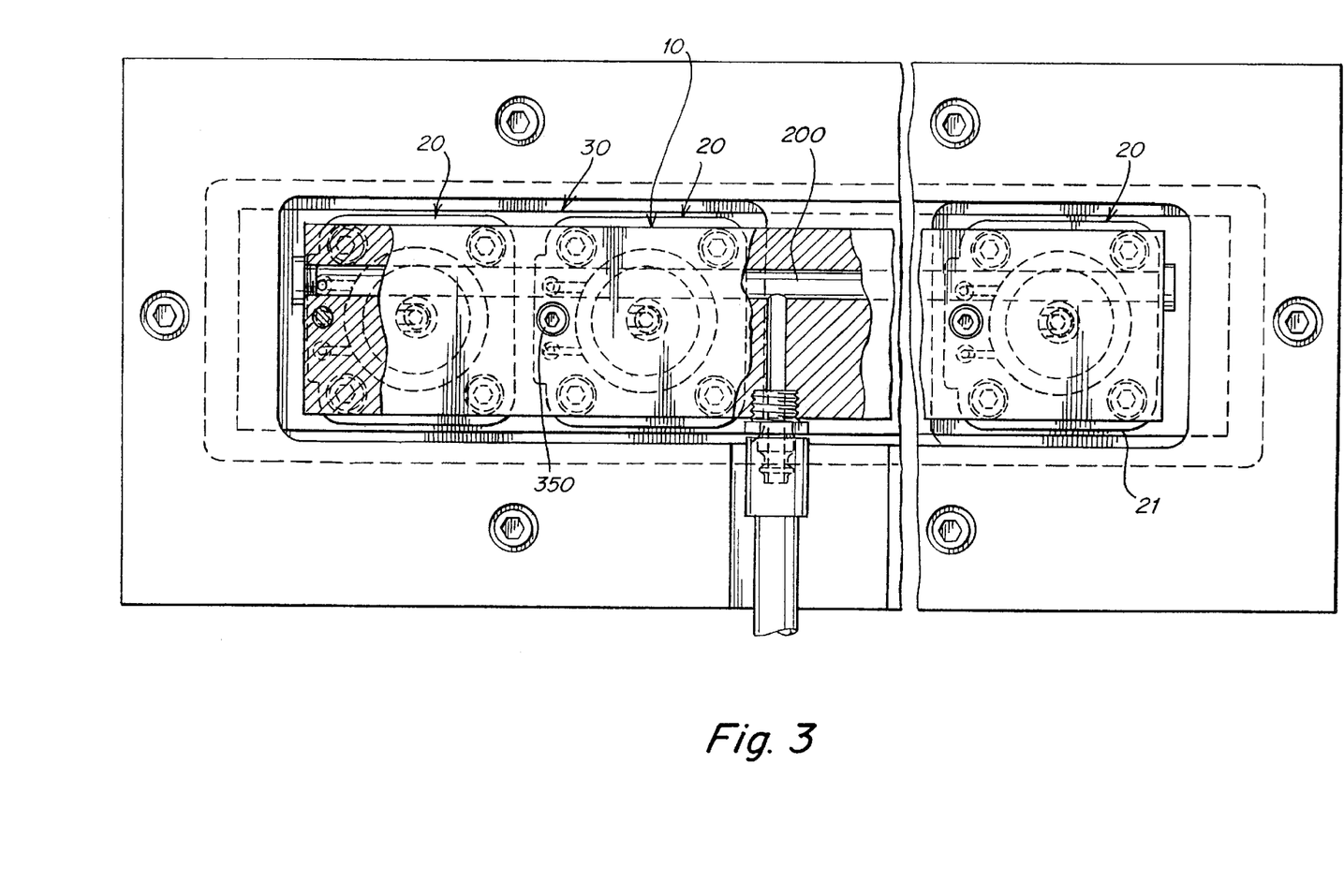
FIG. 3 is a top view of the FIG. 2 apparatus along lines 3—3 in FIG. 2.

Shown in FIG. 2 is one embodiment of an apparatus according to the invention. A distributor duct 10, i.e. a manifold for distributing fluid to a plurality of cylinders, is mounted on a series of fluid driven cylinders 20. The cylinders 20 are mounted on a hot runner or manifold 30 for distributing molten plastic. The cylinders 20 are mounted in a spaced relationship on the hot runner 30 via spacers 40 so as to provide a means by which the head ends 50, FIGS. 2,4,6 of valve pins 60 may be readily accessible to the user for replacement of pins 60. The pin heads 50 are interconnected to the stems 70 of the cylinder pistons 80 at a position external to the bores 90 of the cylinders 20 thus enabling the heads 50 of the pins 60 to be readily connected to and disconnected from the piston stems 70. Contact and thermal conduction between the manifold 30 (and its associated plates 31 and bushings 32) and the cylinder housings 21 is also minimized, FIG. 2, by the spacing between cylinders 20 and manifold 30.

As shown in FIG. 2, a plurality of cylinders 20 are provided with fluid, typically air (pneumatic) or oil (hydraulic) by the distributor duct or fluid delivery manifold. Each cylinder 20 has a piston 80 mounted within a self-contained, fluid sealed housing 21, FIGS. 2–6. The plurality of cylinders 20 are commonly provided with fluid input/output by duct or manifold 10 unlike state of the art designs, FIG. 1, where a cover plate 100 is precision fit and bolted 107 in highly compressed contact onto a small upper rim surface 105 of an open-top cylinder bore 110. The bolted down plate 100 in effect forms the top portion of the enclosure of the bore 110 and is a structural component of the injection one or the other of the first and second fluid input ports of each cylinder to a fluid flow channel.

As shown in FIGS. 2–5 the pins 60 extend through a complementary aperture drilled in the body of the hot runner 30 and into, through and along the central axis of the end portions of plastic flow channels 120, the ends of which channels 120 terminate in nozzles 130. The pistons 80 are fluid driven within bores 90 in an up and down reciprocating fashion which in turn causes pins 60 to move up and down in reciprocating fashion. The tip ends 61 of pins 60 have an external surface which is complementary to the tip ends of the output apertures 140 of the channels 120 such that when the tip ends 61 of the pins 60 are in the position shown in FIG. 2 the nozzle output apertures 140 are closed off and plastic flow into mold cavities 150 is prevented. Conversely, when the pins 60 are retracted upwardly, the tip end apertures 140 are opened and plastic melt may flow into the cavities 150. As can be readily imagined, a common distributor channel 125 distributes plastic melt flow to each end portion channel 120 which is/are aligned with a separate gate opening 141 to a separate mold cavity 150.

As shown in FIGS. 2–5, a distributor duct 10 according to the invention has at least one fluid sealed distributor channel 200 which commonly feeds at least two cylinders or actuators 20. In the embodiments shown in FIGS. 2–5, the common fluid feed channel 200 sealably communicates with bores or ports 201,202 which sealably communicate with bores or ports 203,204 which sealably communicate respectively with the lower and upper chambers 92, 91 of the piston bore 90. The mating of the ends of bores 201/202 and 203/204 in a fluid sealed fashion is preferably effected by use of a compressible washer or O-ring 300, FIG. 4, which is seated between the undersurface of duct 10 and the upper surface of cylinder housing 21. O-rings 300 may comprise any fluid inert, compressible polymeric material such as a high temperature resistant, compressible rubber, plastic or elastomeric material typically a material such as Viton®. The use of an O-ring, washer or the like which is compressible enables the duct 10 and cylinder housing 21 to be constructed such that the drilling, dimensioning and disposition of various components such as the feed bores 201/202 and their alignment with bores 203/204 need not be so very highly precise (as is required in the prior art) so as to effect a fluid sealed mating or communication between the duct channel 200 and the upper 91 and lower 92 cavities of cylinder bore 90. The disclosure of parent application U.S. Ser. No. 09/081,360 which is incorporated herein by reference discloses exemplary embodiments for such machining and mounting.

Figure 5:
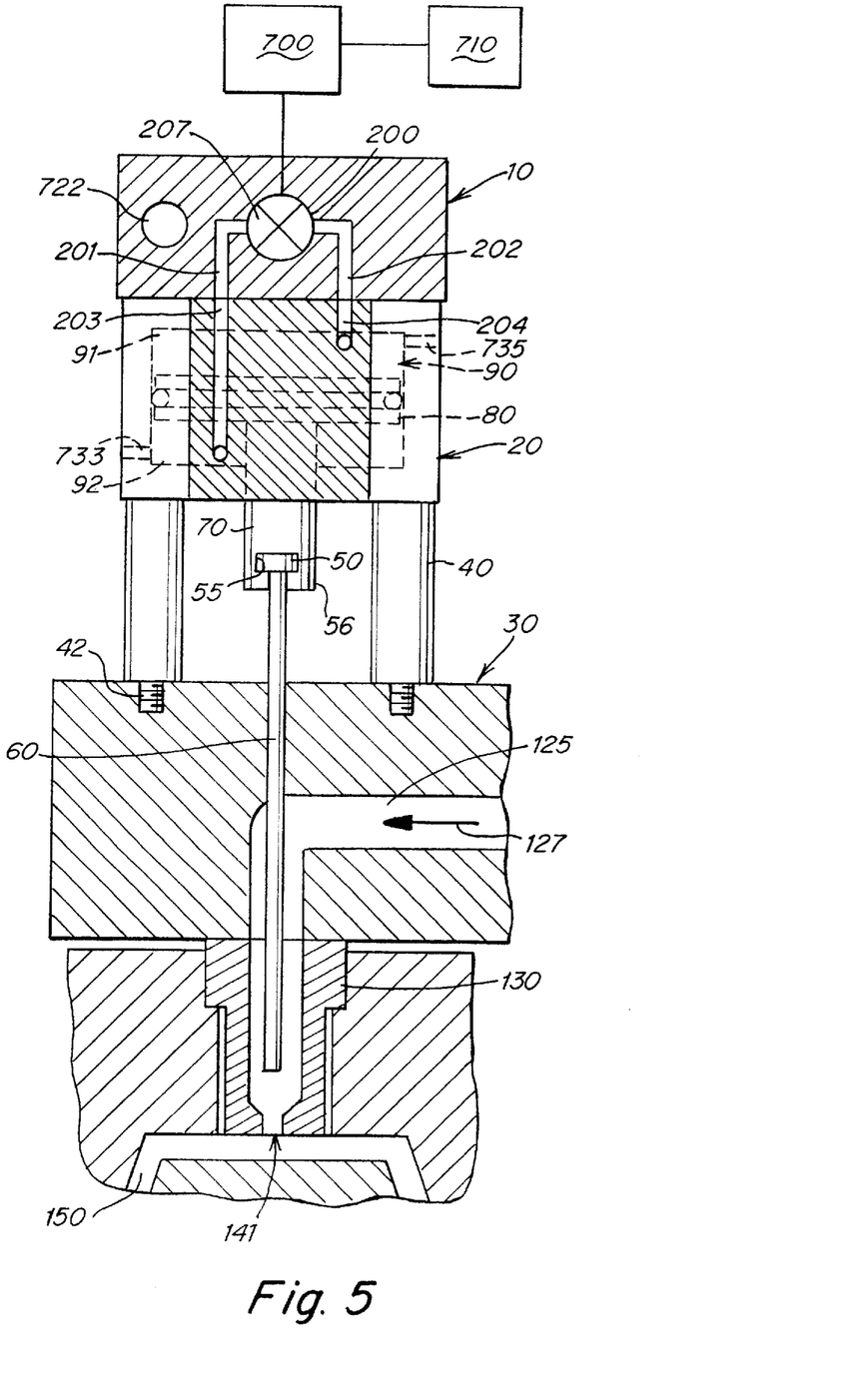
FIG. 5 is a schematic cross-sectional view of a generic electrically driven fluid flow controller mounted on a distributor which is mounted on an actuator mounted on a hotrunner.

FIG. 5 shows a schematic embodiment of an apparatus according to the invention having a fluid controller or switch 207 disposed in the common fluid channel 200 for selectively controlling the direction of pressurized fluid into either of ports 201 or 202. The controller 207 comprises a valve (e.g. ball or rotation valve), solenoid or other conventional mechanism for diverting and directing flow of the drive fluid from channel 200 into one of ports 201 or 202 while simultaneously sealing the other of ports 201 or 202 off. The fluid controller or switch 207 is preferably driven by a suitable electrically powered drive mechanism 700 the drive of which is controlled by a computer program 710. Such electrical drive 700 obviates the necessity for separately controlled fluid carrying lines running to each individual cylinder 20 and further allows the potential for wireless (e.g. microwave or other radio signal) communication with and control of the electrically driven mechanism 700.

Figure 4:
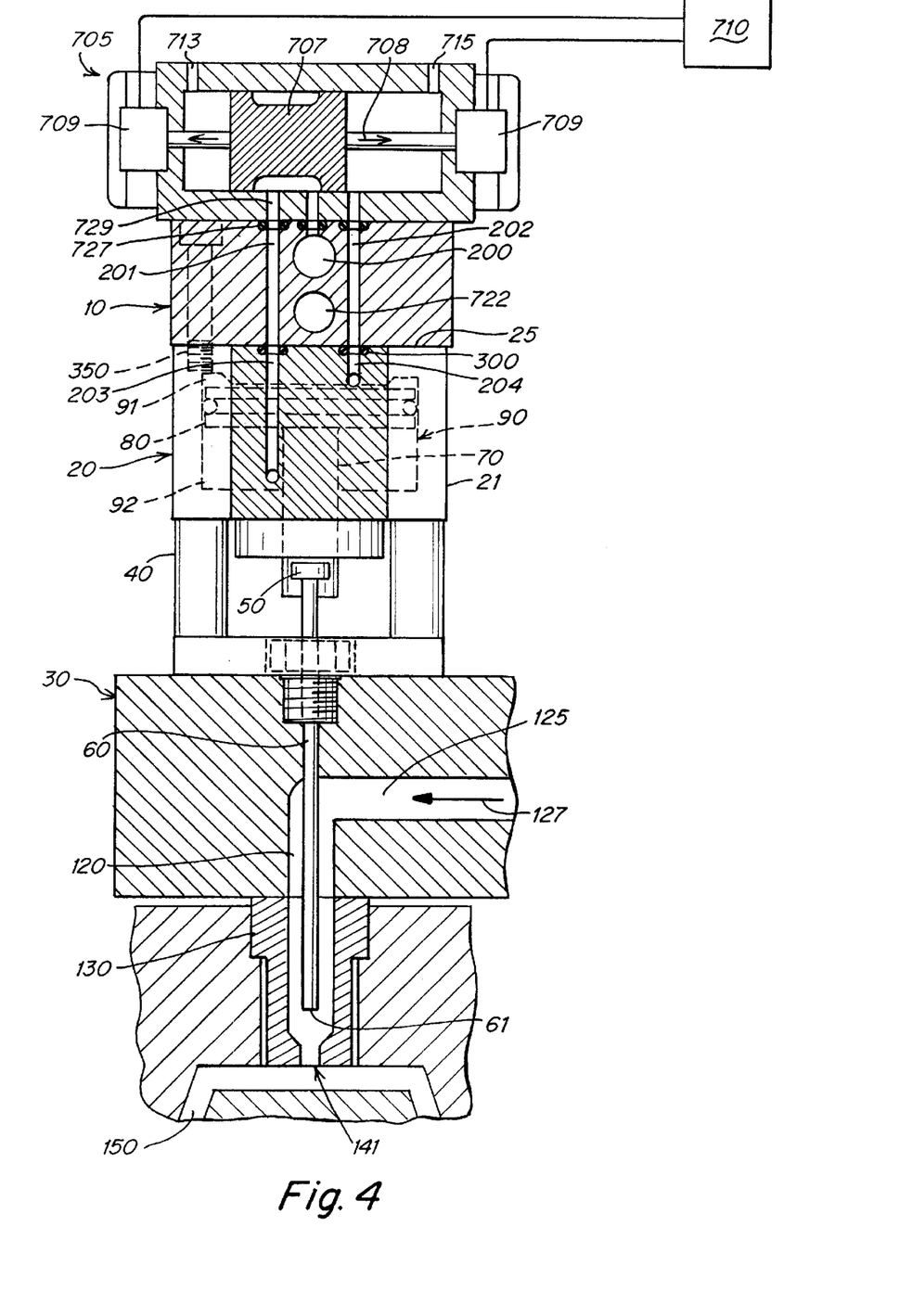
FIG. 4 is a cross-sectional view of an electrically driven fluid flow controller mounted on a fluid distributor which is, in turn, mounted on a fluid driven actuator which is, in turn, mounted on a hotrunner.

FIG. 4 shows an embodiment where the fluid controller or switch comprises a solenoid 705 having a piston 707 which is controllably movable back and forth 708 via electrically driven solenoid elements 709 the drive of which is controlled by computer program 710. As shown the piston 707 of the solenoid selectively connects or effects a fluid flow communication path between port 201 and channel 200 or port 202 and channel 200. As can be readily imagined, when port 201 is connected to pressurized fluid channel 200, pressurized fluid will flow into chamber 92 and piston 80 and pin 60 are moved upwardly away from gate 141 (at the same time any fluid in the left side chamber of the solenoid 705 will vent through vent 713 and port 202 will be effectively cut off or sealed from communication with the pressurized fluid in channel 200. Similarly when piston 707 is moved to the right, the right side chamber of the solenoid 705 is vented through vent 715, port 202 is connected to channel 200 (effectively cutting off or sealing port 201 from channel 200) and pressurized fluid will be directed/diverted into piston chamber causing piston 80 and pin 60 to move downwardly toward gate 141. Vents analogous to the FIG. 4 vents 713, 715 are shown in the FIG. 5 embodiment as vents 733, 735 provided in the cylinder 20 housing.

As described in copending U.S. application Ser. No. 08/972,277 the disclosure of which is incorporated herein by reference, the pin 60 may configured to have any selected shape/contour and travel according any selected time, event, travel profile in order to control the flow of molten plastic 127 through individual gates 141 into cavity(ies) 150. As can also be readily imagined, selected control of separate fluid controllers 207 (such as solenoids 705), FIGS. 4, 5, can be readily accomplished via programming of computer program 710 with predetermined algorithms. The algorithms for control of the valve gates typically utilize as variables inputs of signals from one or more sensors which are representative of the pressure of the plastic melt in the nozzle, the cavity, the manifold, the pressure on or the position of the pin, the position of the injection mold machine screw or any other desired plastic melt or machine component condition or position. Such selective programming and configuration of pins 60, gates 141 and the like can thus be utilized to carry out any desired individual action of individual nozzles/cylinders including sequential or cascade valve gating in a system involving multiple nozzles, mold cavities and the like.

As shown in FIGS. 4, 5 the distributor manifold 10 preferably includes a channel 722 for a coolant or a heating substance for purposes of selectively controlling the temperature of the manifold 10. Typically the manifold 10 is cooled to assist in cooling the cylinders 20 which are exposed to the elevated temperatures of the hotrunner 30.

Also as shown the controllers 207/705, FIGS. 2, 4, 5 may be readily mounted in fluid sealed arrangement on manifold 10 in the same manner as manifold 10 is mounted on cylinders 20. As shown in FIG. 4, compressible washers 727 (as described above with reference to washers 300) may be utilized to effect fluid sealed mating between the ports 201/202, channel 200 and the bores such as bore 279 which lead into the interior of solenoid 705.

Figure 1:
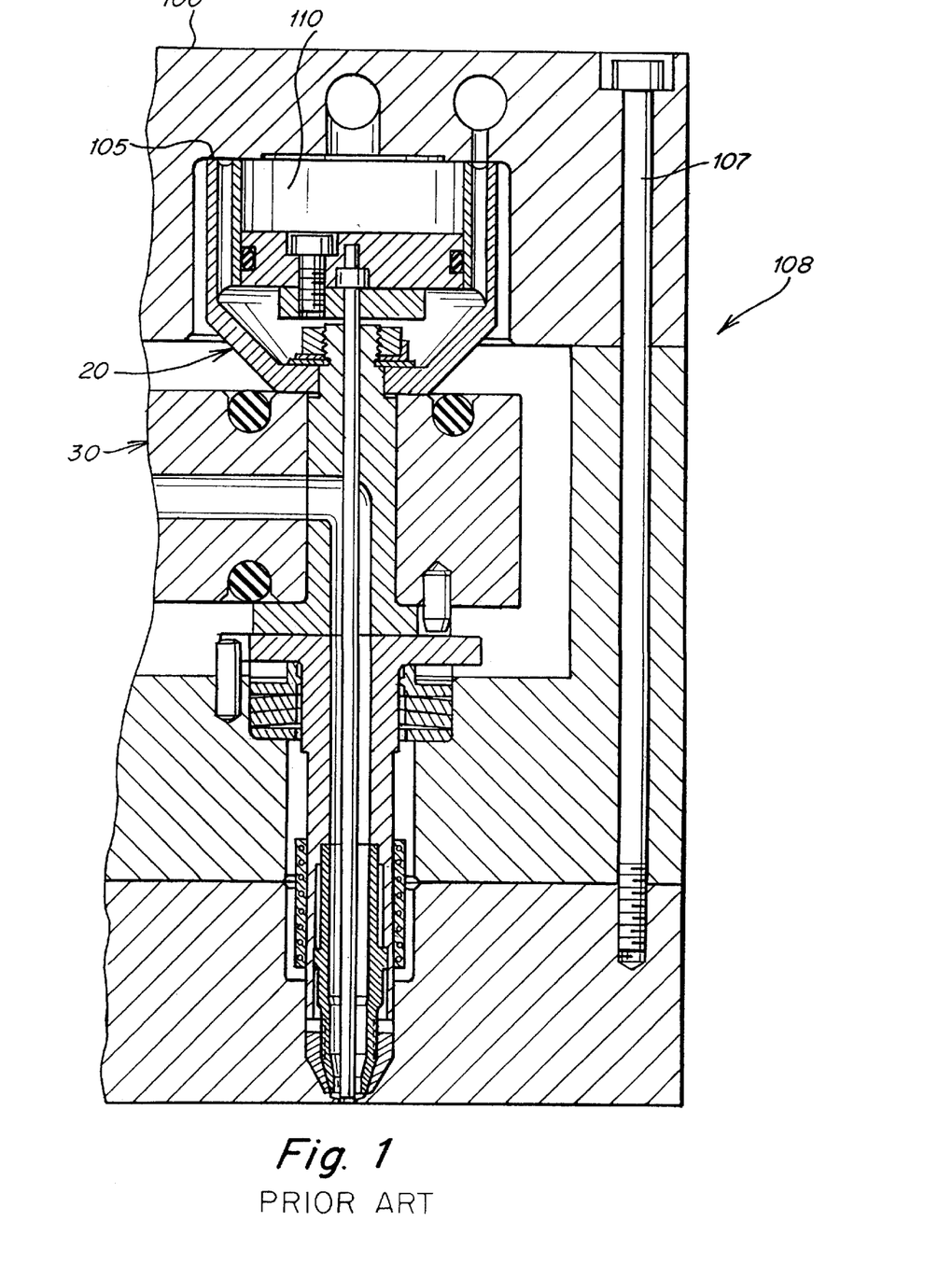
FIG. 1 is a cross-sectional view of a typical prior cylinder/fluid distributor arrangement in which a specially machined, custom plate functions as a structural component of an injection molding machine and as a mechanism by which the top end of the bores of a series of cylinders are fluid sealed/enclosed.

The fluid distributor manifold 10 may alternatively comprise a structural component of the piston housings 91 of the cylinders 20 in the manner as shown in FIG. 1. At least one fluid flow channel commonly feeding separate cylinders could be provided in such a manifold in combination with individual controllers 207 as described above. As shown in the embodiments in the figures, the manifold 10, 400 is readily attachable to and detachable from the cylinders 20 via bolts 350 as a structure independent of the housings 91 of the cylinders 20. In such an embodiment, the manifold 10, 400 may be readily constructed independent of the cylinders without regard to providing very highly precise mating of surfaces or alignment of bore ends which function together with other surfaces on the cylinders. The compressible nature of the materials of which the O-rings, washers or the like 300, 310 are comprised, enables the channels 200 to be readily connected to the cylinders 90 in a sealed fashion around a relatively widened surface area around the ends of the ports 201/203 and 202/204 without the necessity for highly precise alignment. The elastomeric material of which the seals 300 are comprised also provides a better fluid sealing function than metal to metal contact as is required in the prior art.

As shown in FIG. 5, the end 56 of the stem 70 the piston 80, FIG. 2, is provided with a slot 55 into and out of which the head end 50 of the pin 60 is readily slidable. As shown, the cylinders 20 are boltable onto the top of the manifolds 30 via bolts 42, FIGS. 5. The bolts 42 are readily connectable to and disconnectable such that the cylinders 20 are readily connectable to and disconnectable from the hotrunner 30. The ready detachability of cylinders 20 from the top of manifold 30 thus enables the user to readily replace pins 60 when needed.

Figure 6:
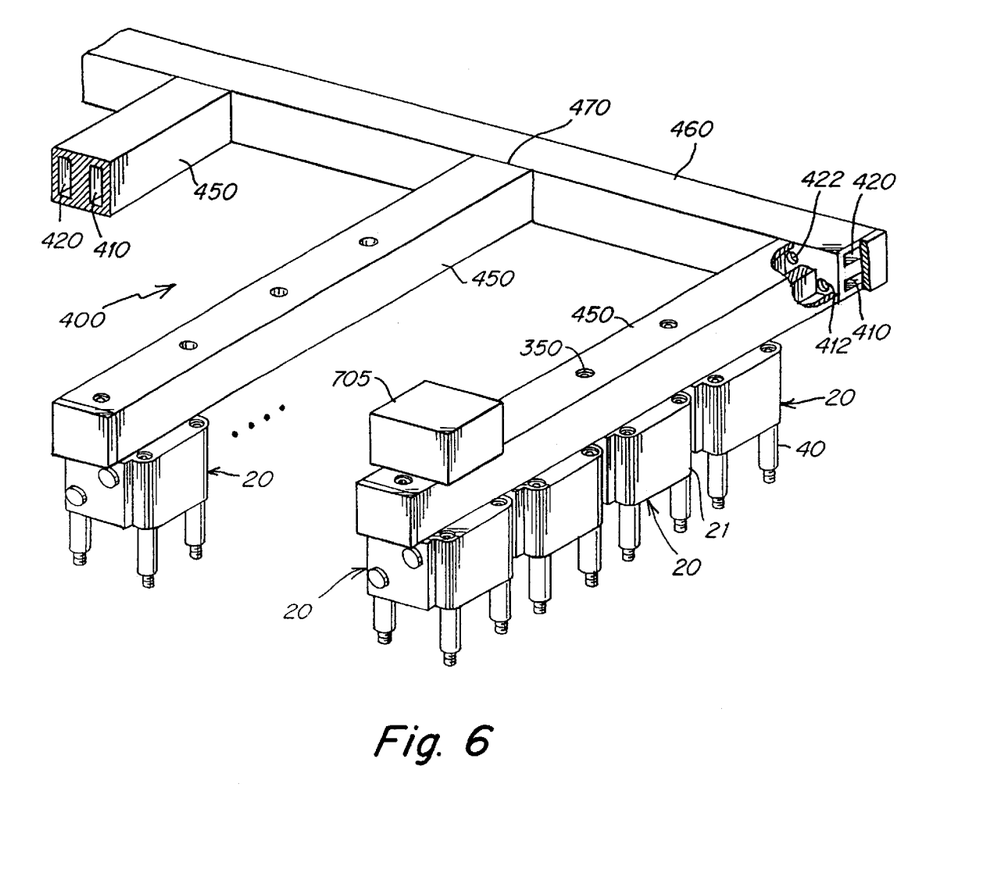
FIG. 6 is a top, perspective view of a modular-type embodiment of an apparatus according to the invention showing an arrangement together with a plurality of associated of cylinders and a fluid flow controller mounted on the fluid distributor.

FIGS. 6, 7 show a distribution duct 400 for distributing fluid to the cylinders in a modular configuration. As shown, the duct 400 may be constructed as an assembly of leg components 450 which are each sealably connected to a manifold component 460. Depending on the size, configuration and structure of the particular hot runner 30, which may vary in any given injection molding machine, the duct 400 may be constructed to include any selected number of legs 450 as may be required to complement the variable size/configuration of the hot runner 30. Similar to the embodiments described with reference to FIGS. 2–5, the legs 450 and manifold component 460 have at least one fluid flow channel 410, and in the embodiment shown where hydraulic fluid might be utilized a second channel 420 for return of the vent output of the controllers 207/705. Alternatively a second fluid flow channel may be utilized as a source for separate pressurized fluid input to one of the piston chambers 91, 92. As can be readily imagined legs 450 are connectable to the manifold component 460 at fluid sealed joint 470 in a conventional manner, e.g. via a gasket or washer; and the channels 410, 420 in manifold component 460 communicate with the channels 410, 420 in the legs via ports 412, 422 which may selectively be drilled into component 460 to connect a leg 450 along the length of component 460 as needed to confirm to any particular hot runner 30.

In the normal course of usage of an injection molding machine, the plastic flow distribution manifold 30 and other components are heated to high temperatures, e.g. 300° F. to 800° F., in order to melt the plastic and maintain flow up to the gate 141, FIG. 2, to the mold cavity 150. The heat generated in the manifold 30 will conduct to the cylinders 20 which can be damaged by such heat, in particular the central gasket or O-ring 81 which maintains a fluid seal between the upper and lower chambers 91, 92 of the cylinder bore 90. Unlike the prior art, the duct 10, 400 acts as a heat sink for the cylinders 20 by virtue of the widened surface area of contact which may be provided between the duct 10, 400 and the surface 25 of the cylinder housing 21. A widened area of contact between the undersurface of duct 10, 400 and the mating surface of a cylinder 20 may be effected upon assembly via bolt 350. Such widened surface area contact is preferably at least about one square centimeter, and typically ranges between about one and about 10 square centimeters. In prior systems such as shown in FIG. 1, the surface area contact 105 is insufficient to serve as a means for conducting a substantial amount of heat from the cylinder 20 to the structural plate 100, the contact area 105 being a narrow disc or circular shape. The mating area of contact between the cylinder 90 surface and a duct undersurface according to some embodiments of the invention is at least sufficient to enable or allow conduction of a substantial amount of heat from the cylinder housing 91 to the duct 10 or 400. The duct 10 is comprised of a heat conductive material such as iron, steel, copper, aluminum or other heat conductive metal material and/or mixtures of all of the foregoing.

In the embodiments shown in the Figures, the point of connection of the pin head 50 to the piston 80 is at a position at the end of stem 57, FIG. 4, which is external to the cylinder bore 90 and always remains external to the cylinder bore 90 before, during and after up and down movement of the piston 80. Corrosive gases, heat and other materials which are external to the cylinder bore 90 thus cannot invade the cylinder bore 90 through an aperture, slot or the like by which the pin 60 is connected to the piston 80. And, the external pin/piston connection obviates the necessity for disassembling the cylinder 20 in order to replace a pin 60.

It will now be apparent to those skilled in the art that other embodiments, improvements, details and uses can be made consistent with the letter and spirit of the foregoing disclosure and within the scope of this patent, which is limited only by the following claims, construed in accordance with patent law, including the doctrine of equivalents.

What is claimed is:

1. In an injection molding machine, an apparatus for separately controlling the movement of two or more valve pins wherein each valve pin is driven by a separate fluid driven cylinder, each separate cylinder being mounted on a heated manifold and being interconnected to a separate valve pin for effecting reciprocal movement of the valve pin wherein the reciprocal movement of the valve pin controls the flow of molten plastic being delivered through a nozzle which delivers molten plastic to a gate of a mold, the apparatus comprising:

a fluid distributor housing having a fluid flow channel which commonly delivers a drive fluid to each of the cylinders, each of the cylinders having a piston slidably mounted within a bore of an enclosed cylinder housing for reciprocal fluid driven movement of the piston within the bore of the cylinder housing;

each cylinder having a first and a second fluid input port to the bore of each cylinder housing, the first and second fluid input ports being selectively connectable to the fluid flow channel of the fluid distributor housing;

a drive fluid switch associated with each cylinder, each switch having a drive fluid flow connector and a drive fluid seal, the connector of each switch being connectable to one of the first and second fluid input ports of each cylinder while the seal of each switch is simultaneously operative to act on the other of the first and second fluid input ports of each cylinder.

2. The apparatus of claim 1, wherein each switch is independently controllable to switch the connection of the connector and the seal between the first and second fluid input ports of each cylinder.

3. The apparatus of claim 1, wherein each switch is interconnected to an electrically driven mechanism, the electrically driven mechanism driving the switch between a first position connecting the first fluid input port to the fluid flow channel and a second position connecting the second fluid input port to the fluid flow channel.

4. The apparatus of claim 3, wherein the electrically driven mechanisms are interconnected to a common computer program which controls the drive of each electrically driven mechanism according to a predetermined algorithm.

5. The apparatus of claim 4, wherein the algorithm controls the drive of the electrically driven mechanisms according to at least one of a selected condition of the molten plastic, a selected position of the valve pin and a selected condition or position of the injection molding machine.

6. The apparatus of claim 1, wherein the fluid distributor housing includes first and second fluid flow bores sealably matable with the first and second fluid flow ports respectively of each cylinder.

7. The apparatus of claim 3, including a compressible member sandwiched between each fluid flow bore of the distributor housing and each complementary fluid input port of the cylinders such that fluid flow between each fluid flow bore and each complementary fluid input port is fluid sealed.

8. The apparatus of claim 1, wherein each cylinder has a selected widened external mounting surface and the distributor duct housing has complementary selected widened external surface areas for mating with the selected mounting surfaces of the cylinders.

9. The apparatus of claim 1, wherein the fluid distributor housing is readily attachable to and detachable from each of the cylinders.

10. The apparatus of claim 1, wherein the cylinders are mounted a spaced distance on and from an external surface of the heated manifold.

11. The apparatus of claim 1, wherein the cylinders are interconnected to the valve pins at a position external to the bores of the enclosed cylinder housings.

12. The apparatus of claim 1, wherein the fluid distributor housing comprises a heat conductive material, the fluid distributor housing being mounted on the cylinders such that the selected widened mounting surfaces of the cylinders are mated in compressed contact with the complementary selected widened surface areas of the fluid distributor housing, heat being readily conductible from the cylinders to the fluid distributor housing through the mated surfaces.

13. The apparatus of claim 1, wherein the fluid distributor housing comprises at least a portion of a wall of the cylinder housing which sealably encloses the bore of the cylinder.

* * * * *